Patented Sept. 6, 1938

2,129,025

UNITED STATES PATENT OFFICE 2,129,025

INSECTICIDE

Alfred Rieche, Wolfen, Kreis Bitterfeld, and Hans Maier-Bode and Wolfgang Eckardt, Dessau in Anhalt, Germany, assignors to Winthrop Chemical Company, Inc., New York, N. Y., a corporation of New York No Drawing. Application November 6, 1936, Serial No. 109,548. In Germany December 7, 1935

8 Claims. (Cl. 167—22)

The present invention relates to a new process for exterminating insects.

It is based on the observation that halogenated ketals are active agents for combating insect pests of various kinds in their several stages of development, for example, weevils, flour moths, clothes moths, sweetmeat moths, bugs, ants, worms, butterflies and the like.

The effect of halogenated aldehydes and ketones, for example chloral, dichloracetaldehyde, monochloracetaldehyde, monochloracetone on the lower orders of animal pests is known. These compounds, however, have various disadvantages, for instance, their lack of stability and especially their disagreeable odor and in some cases damage the skin. The halogen derivatives of the higher aldehydes, thus as β-chlorbutylaldehyde have these disadvantages only in a diminished degree, but are only feebly acting as insecticides. Furthermore, the use of hydrates of halogenated aldehydes has been suggested as insecticide, these compounds, however, likewise have an irritating effect.

Finally, acetals of mono- or dichloraldehydes have been proved with respect to their insecticidal action, they show, however, a worse action than the halogenated ketals, as may be seen from the table following hereafter:

|  | Applied quantity in grams per 100 kg. of grain | Killed weevils after 24 hours in percent |
|---|---|---|
| β-chlorbutyraldehyde | 30 | 8 |
| Monochloracetaldehyde hydrate | 15 | 6 |
| Dichloracetal | 30 | 29 |
| Monochloracetone-dimethylketal | 7 | 100 |
| Dichloracetone-dimethylketal | 7 | 100 |

Compounds which are useful according to the present invention are, for instance:—mono- and dichloracetonedialkylketals, dibromacetone-dialkylketals, ω-halogenacetophenone-dialkylketals and so on.

These agents may be scattered, atomized, sprayed, or distributed in the form of vapor or gas, if desired with aid of solid or liquid extenders, diluents, solvents or emulsifiers.

The following examples illustrate the invention:

Example 1.—3 grams of 1.3-dichloracetone-dimethylketal are mixed with 100 kilos of wheat which is strongly infected with weevil. After a short time all the weevils will have been killed.

Example 2.—The product obtained by melting together equal parts of 1.3-dichloracetone-dimethylketal and 1.4-dichlorobenzene and by grinding the cooled mixture is an effecting agent for combating clothes moths.

Example 3.—When substituting in Example 1 the dichloracetoneketal by the same quantity of monochloracetone-dimethylketal the weevils likewise will have been killed in a short time.

Example 4.—15 liters of monochloracetone-dimethylketal are vaporized in a grain-silo containing 50 t. of wheat which is strongly infected with weevil. In a short time all the weevils will have been killed.

In an analogous manner there may be used, for instance: — Monochloracetone - diethylketal, monochloracetone-glycolketal, monochlorglycerinemonochlorhydrineketal, 1.1 - dichloracetone-dimethylketal, ω - chloracetophenone - dimethylketal, we prefer, however, to apply 1.3-dichloracetone-dimethylketal, since this product has an outstanding good action.

The permanence of these compounds is in general very good but it may happen that in consequence of unfavorable conditions of storage or some retention of a small proportion of impurity there is produced a slight decomposition of the halogenated ketal with formation of objectionably smelling halogen ketone.

We have found, however, that the use of the halogenated ketals as insecticides may be improved by mixing them with an acid-binding agent. Such mixtures do not suffer the decomposition referred to above and therefore better serve the purpose for which a halogenated compound is required. Suitable acid-binding agents are magnesium oxide, secondary or tertiary sodium phosphate, chalk, sodium bicarbonate, sodium carbonate or the like. The amount of the acid-binding agent added may be quite small but any desired proportion may be used so that the acid-binding agent becomes an extender or diluent. Preparations which have acquired the objectionable smell of halogen ketone by long storing in moist air may be subsequently mixed with the acid-binding agent and thereby freed from the odor. Again, such an acid-binding agent may render fit for use preparations which are insufficiently purified.

This improvement is illustrated by the following examples, the parts being by weight:—

Example 5.—A mixture of 100 parts of a crude dichloracetone-dimethylketal and 3 parts of magnesium oxide after storage for 3 months in moist air has no odor of dichloracetone, whereas some ketal stored under like conditions without the addition of the magnesium oxide acquires a weak smell of dichloracetone.

*Example 6.*—100 parts of crude dichloracetone-dimethylketal having a feeble smell of dichloracetone are mixed with 3 parts of tertiary sodium prosphate; the mixture soon loses its objectionable odor.

It is obvious that our invention is not limited to the examples given above or to the specific details given therein. The other halogenated glycols mentioned above or the homologous compounds of those mentioned in the examples, for instance, mono- and dichlorinated ketals derived from methylethylketone, are likewise useful for the purpose set forth.

What we claim is:—

1. An insecticide containing a halogenated ketal.

2. An insecticide containing a dichloracetone-dimethylketal.

3. An insecticide containing 1.3-dichloracetone-dimethylketal.

4. An insecticide containing monochloracetone-dimethylketal.

5. An insecticide comprising a halogenated ketal and an acid-binding agent.

6. An insecticide comprising a dichloracetone-dimethylketal and an acid-binding agent.

7. An insecticide comprising 1.3-dichloracetone-dimethylketal and an acid-binding agent.

8. An insecticide comprising monochloracetone-dimethylketal and an acid-binding agent.

ALFRED RIECHE.
HANS MAIER-BODE.
WOLFGANG ECKARDT.